United States Patent [19]

Krempel et al.

[11] Patent Number: 5,078,005
[45] Date of Patent: Jan. 7, 1992

[54] METHOD AND APPARATUS FOR CHECKING THE BONDING OF A CELLULAR STRUCTURE TO A SUPPORT

[75] Inventors: Claude J. Krempel, Vaux Le Penil; Jean-Louis G. Mache, Vert St Denis, both of France

[73] Assignee: Societe Nationale D'Etude Et De Construction De Moteurs D'Aviation "S.N.E.C.M.A.", Paris, France

[21] Appl. No.: 625,098

[22] Filed: Dec. 10, 1990

[30] Foreign Application Priority Data

Dec. 11, 1989 [FR] France .................... 89 16350

[51] Int. Cl.$^5$ ......................................... G01N 33/00
[52] U.S. Cl. ........................................ 73/37
[58] Field of Search .................. 73/37, 38, 40, 46

[56] References Cited

U.S. PATENT DOCUMENTS

| | | | |
|---|---|---|---|
| 2,694,924 | 11/1954 | Matlock et al. | 73/37 |
| 2,842,957 | 7/1958 | Bacon, Jr. | 73/37 |
| 4,043,179 | 8/1977 | Ingle, Jr. | 73/37 |
| 4,052,885 | 10/1977 | Shuck | 73/38 |
| 4,393,699 | 7/1983 | Seiler, Jr. | 73/37 X |

FOREIGN PATENT DOCUMENTS

| | | | |
|---|---|---|---|
| 215694 | 10/1941 | Switzerland. | |
| 770550 | 3/1957 | United Kingdom | 73/37 |
| 917996 | 2/1963 | United Kingdom | 73/37 |
| 1197631 | 7/1970 | United Kingdom. | |

Primary Examiner—Tom Noland
Assistant Examiner—Joseph W. Roskos
Attorney, Agent, or Firm—Oblon, Spivak, McClelland, Maier & Neustadt

[57] ABSTRACT

The bonding of a honeycomb structure to a support at one end of the cells of the structure is checked by applying a detector to the opposite end of the cells, the detector comprising first and second compartments which are separated by a partition, supplying compressed air to the first compartment, and measuring the flow of air out of the second compartment by means of a flowmeter connected to an outlet from the second compartment. The flow value measured by the flowmeter enables one to determine whether or not there are any non-bonded areas between the honeycomb structure and the support in the region of the detector.

11 Claims, 4 Drawing Sheets

U.S. Patent  Jan. 7, 1992  Sheet 1 of 4  5,078,005
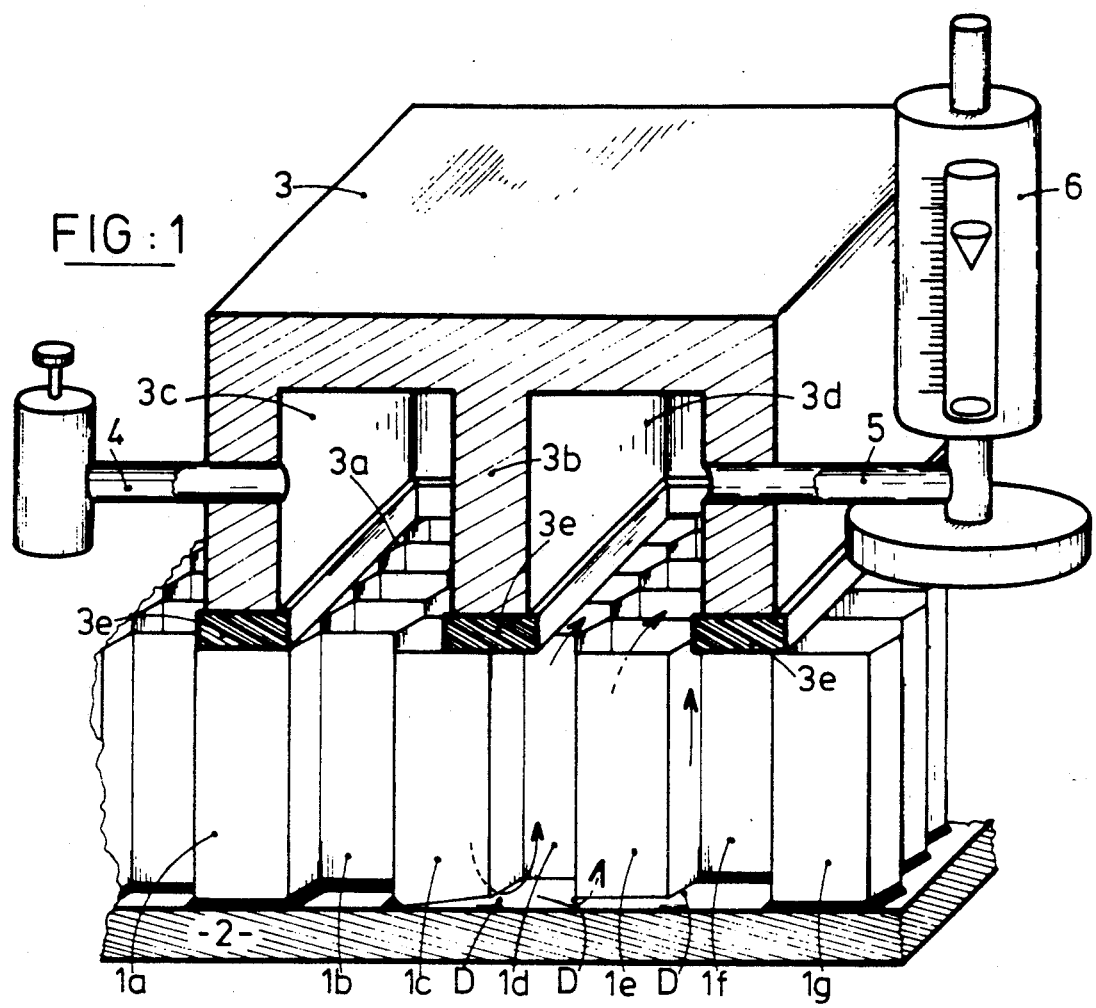
FIG:1
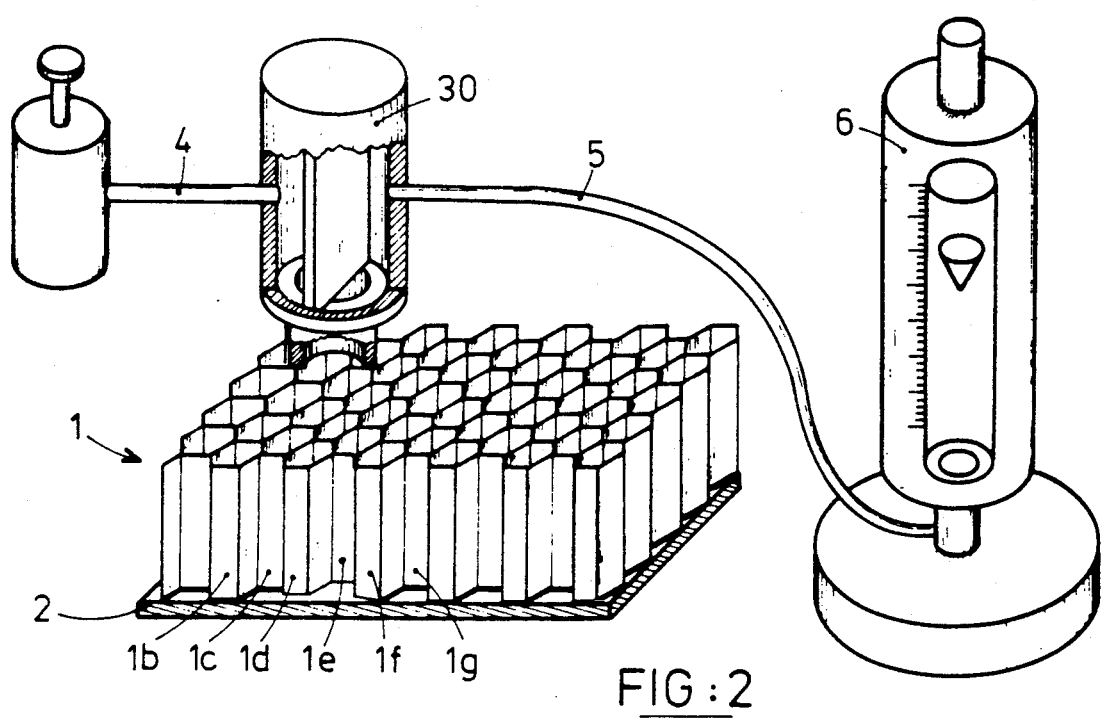
FIG:2

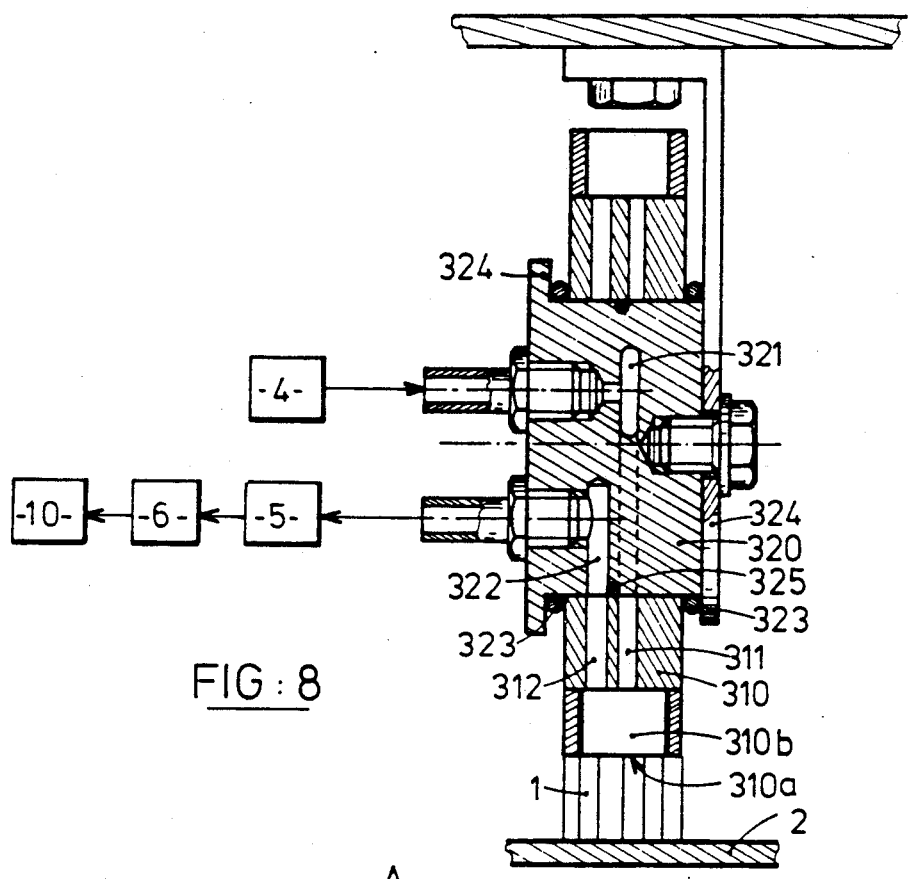
FIG: 8
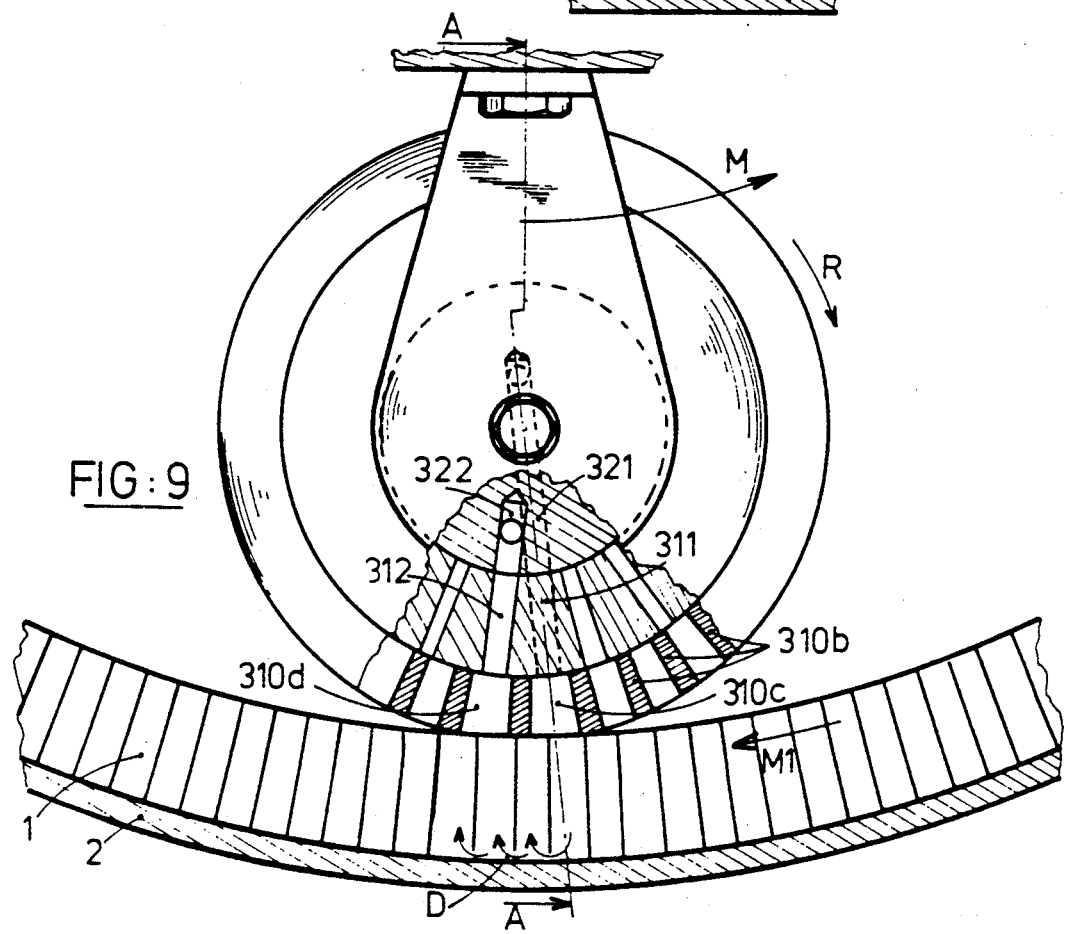
FIG: 9

METHOD AND APPARATUS FOR CHECKING THE BONDING OF A CELLULAR STRUCTURE TO A SUPPORT

BACKGROUND OF THE INVENTION

1. Field of the Invention

The present invention relates to a method of checking the bonding of a cellular structure, such as those termed "honeycomb structures" to a support, and also to apparatus for carrying out the method.

In this specification the term "honeycomb" is intended to refer to any kind of cellular structure, whatever may be the geometry of the cells. Similarly, it is to be understood that the term "bonding" does not imply any restrictions as to the method of achieving the bonding. The invention is applicable to the checking of any method of binding the honeycomb to its support, whether by glueing, welding, brazing or any other method of binding.

More and more the aeronautical industry is making use of honeycomb structures, because of their lightness and resistance to crushing, for structural reinforcement purposes, for example in turbomachine casings and aircraft floors. Another example is the fan casing of a turbojet engine, outside which it is possible to arrange an annular strip of honeycomb reinforcement in line with the fan blades to replace the reinforcing ribs which have been used previously and the machining of which required a substantial extra thickness of the initial component in relation to the finished component.

The honeycomb structure thus used is a particularly effective reinforcement structure provided it is bonded to the support at the bottom of all of its cells. To make sure of this, it is necessary to carry out a very tight statistical verification of this bonding.

2. Summary of the Prior Art

At present, this examination is made by endoscopic checking of the bottoms of the cells by very powerful illumination of a cell and examining the bottom of the adjacent cell to see whether a bonding fault allows a ray of light to pass between the illuminated cell and the adjacent cell.

This check is carried out statistically by inspecting the strip of honeycomb at three or four points across its width every five centimeters along its length. Thus, the checking of a 15 cm wide strip of honeycomb bonded as a reinforcement on a fan casing of 183 cm diameter requires a total checking time which may exceed eight hours, resulting in substantial visual fatigue for the operator and a checking reliability which decreases with time.

The examination may also be carried out by capillarity using a fluorescent liquid. This makes it necessary to use very wetting liquids, which often comprise constituents dangerous to the operator. Moreover, checking a casing requires immersing it in a vat to wet it, thus requiring bulky installations, and the checking operation itself takes as long as that using endoscopic verification.

SUMMARY OF THE INVENTION

It is an object of the present invention to provide a method of checking the bonding of a honeycomb structure to a support which offers an easier alternative to endoscopic checking. For this purpose the principle of the invention consists of applying on a first area of the honeycomb to be checked an enclosure supplied with pressurized air, and observing whether this air is able to issue from the inspected area through faults in the bonding. The measurement of the leak flow rate will thus make it easy to determine the presence or the absence of bonding defects.

A further object of the invention is to provide a checking method and apparatus which can be automated so as to permit an on-line verification in the workshop of the components having a surface fitted with a honeycomb reinforcement structure. It is also an object to provide such automated apparatus for checking the bonding of honeycombs on circular components.

According to the invention there is provided a method of checking the bonding of a honeycomb structure to a support, comprising the steps of providing a detector casing which is open at one face thereof and which includes first and second compartments separated from each other by a partition, said first compartment being open at said open face of said casing and including inlet means, and said second compartment being open at said open face of said casing and including outlet means; connecting a supply of compressed air to said inlet means and connecting a flowmeter to said outlet means; applying said open face of said detector casing to said honeycomb structure at the end of the cells thereof remote from said support whereby air supplied to said first compartment is able to flow into at least those cells of said honeycomb structure which are covered at least partly by said first compartment; measuring the flow of air from said second compartment through said outlet means; and deducing from said measured flow of air the presence or absence of non-bonded zones between said honeycomb structure and said support.

In one embodiment of the method said partition seals against said honeycomb structure when said open face of said detector casing is applied to said structure, whereby air is able to flow from said compartment to said second compartment only via bonding faults between said honeycomb structure and said support in the region of the cells of said structure which are covered by said partition, measurement of a flow of air through said outlet means indicating the presence of a bonding fault, and the absence of any measured flow through said outlet means indicating the absence of bonding faults.

This embodiment is applicable to the checking of the bonding in an area substantially equal to that covered by the detector casing. Thus, the use of a detector casing of substantial size, for example 15 cm × 10 cm, enables a quick idea of the approximate location of faults to be obtained, i.e. in the plane of the partition, while leaving some uncertainty with respect to their location inside this plane.

Thus, to refine the search for the location of the faults, or for checking in areas of difficult access, an alternative embodiment of the method in accordance with the invention may be used. In this embodiment, which is particularly suited to the localized checking of small areas, said partition does not seal against said honeycomb structure when said open face of said detector casing is applied to said structure, whereby air is free to flow from said first compartment to said second compartment, measurement of a flow of air through said outlet means which is less than the flow of air from said supply of compressed air idicating the presence of a bonding fault between said honeycomb structure and said support in the region in line with the walls of said detector casing around said open face thereof.

Also according to the invention, there is provided apparatus for checking the bonding of a honeycomb structure to a support, said honeycomb structure comprising a plurality of cells which are bonded at one end to said support and are open at the opposite end thereof, said apparatus comprising a detector casing which is open at one face thereof, said open face of said casing being adapted to be applied flush against said honeycomb structure at the open end of said cells thereof, a partition dividing the interior of said casing into first and second compartments each of which open at said open face of said casing, an inlet pipe leading into said first compartment, a source of compressed air connected to said inlet pipe for feeding compressed air into said first comprartment, an outlet pipe leading from said second compartment, and at least one flowmeter connected to said outlet pipe for measuring the flow of air passing through said outlet pipe from said second compartment when the open face of said detector casing is applied against said honeycomb structure.

The invention envisages several embodiments of such apparatus, automated or otherwise, including embodiments particularly adapted to checking the bonding of honeycomb reinforcing strips on circular components, such as, for example, turbo-machine casings.

A number of embodiments of the method and apparatus in accordance with the invention will now be described, by way of example, with reference to the accompanying drawings.

BRIEF DESCRIPTION OF THE DRAWINGS.

FIG. 1 is a diagrammatic, part-sectional view showing the principles of one embodiment of apparatus in accordance with the invention and its use in a method of checking relatively large areas of a honeycomb structure.

FIG. 2 is a diagrammatic view showing the principles of a second embodiment suitable for carrying out checking over smaller, more localized areas.

FIGS. 8 and 9 are diagrammatic views showing another embodiment of apparatus in accordance with the invention in which the detector is designed to be rolled over the surface of the honeycomb structure to be checked, FIG. 8 being a section along plane AA in FIG. 9, and FIG. 9 being a front, part-sectional view of the apparatus.

DESCRIPTION OF THE PREFERRED EMBODIMENTS

Figure 3:
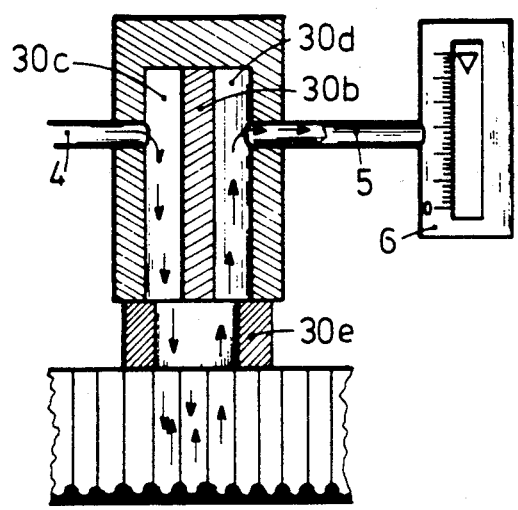
FIGS. 3 and 4 are sectional views of the apparatus of FIG. 2 illustrating its operation when the area checked is sound (FIG. 3), and when the area checked contains a bonding fault (FIG. 4).

FIG. 1 shows part of a honeycomb structure in which the cells are intended to be bonded to a support 2. It will be seen that, between the walls of the cells 1a and 1b, 1b and 1c, 1f and 1g, bonding has been correctly carried out and that beads of adhesive or brazing metal connect the support to the walls of the cells, thus sealing off the bottom of the cells. In contrast, bonding defects D are shown between the walls of cells 1c and 1d, 1d and 1e, 1e and 1f. At these places the wall of the cell is not connected to the support 2.

The detector casing 3 of the apparatus shown in FIG. 1 takes the form of a rectangular parallelepiped which is open at its bottom face 3a and comprises an internal partition 3b dividing the casing into two cavities 3c and 3d. The lower edges of the casing walls around the open bottom face, and also the lower edge of the partition 3b, are provided with a rubber seal 3e which permits the open face 3a of the casing to be applied flush onto the upper ends of the honeycomb cells over the area to be checked so that air cannot pass directly from one of the cavities 3c and 3d to the other, or directly from the inside of the casing to the outside.

The first cavity 3c is connected by means of a pipe or manifold 4 to a source of compressed air, in this embodiment a pressure reducing valve (set at a pressure of 0.4 bar) at the outlet of an industrial compressed air installation.

The second cavity 3d is connected by an exhaust pipe or manifold 5 to a flowmeter 6 through which air will be able to escape from the cavity 3d.

The operation of the detector casing is simple. If the casing is placed over a sound area of the honeycomb structure, compressed air entering the cavity 3c is able to enter the cells of the honeycomb through the opening 3a, but since the bonding of the cells to the support is sound the air is unable to escape from the bottom of the cells. Thus no air can flow into the second cavity 3d of the casing, and the flowmeter 6 to which this cavity 3d is connected will measure nil flow.

On the other hand, if the casing 3 is applied to an area of the structure which includes bonding defects D as shown in FIG. 1, the compressed air entering the cell 1c from the cavity 3c of the casing will be able to escape to the cavity 3d of the casing through the defects D present between the cells 1c and 1d, 1d and 1e, 1e and 1f. The air passing into the cavity 3d will escape through the pipe 5, and the flowmeter 6 will measure the flow thereof.

If the flow measured is equal to the inflow, it is possible to conclude that the leak, and therefore the bonding defect, is localized under the surface of the second compartment of the casing. If the measured outflow rate is less, being between 0 and the inflow rate, one can deduce that the leak is more extensive and that the bonding fault extends over a greater area than the face of the casing.

Figure 6:
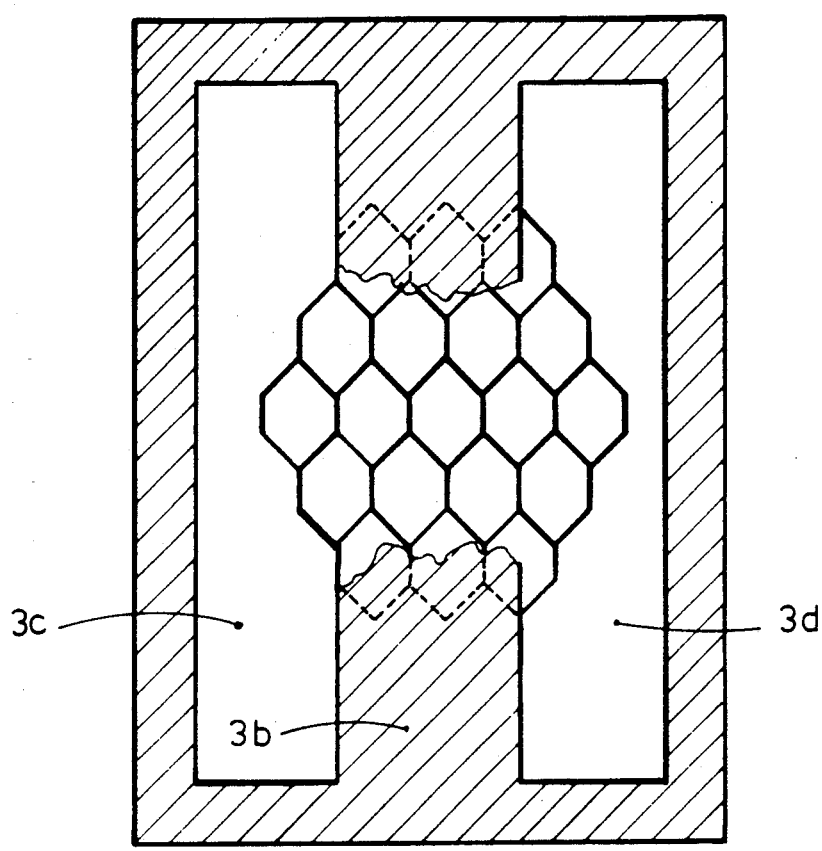
FIG. 6 is a plan view of the open face of the detector casing of the apparatus shown in FIG. 1, illustrating the determination of the thickness of the sealing partition of the casing.

This form of detector is particularly useful for large surfaces. Its size is restricted by the fact that each cavity 3c,3d must have a minimum width equal or less than that of one cell and a half. The maximum size is limited only by the degree of accuracy it is desired to obtain in locating a bonding defect. The dimensioning of the partition 3b is also important. On examining FIG. 6 it will be seen that the size of the partition should be established depending upon the size of the maximum permissible bonding defect, the partition needing to have a thickness which is one half cell width less than that of the maximum permissible defect. For example, if the maximum permissible defect is equal to the width of three cells, the partition must have a thickness equal to two and a half cells. In the majority of cases a thickness equal to one and a half cells may be considered sufficient.

The embodiment of FIG. 1 is therefore particularly suited to a rapid detection of general bonding fault locations. This detection may then be refined, if necessary, by means of the embodiment shown in FIGS. 2 to 4.

In this second embodiment, only the detector casing 30 differs from the FIG. 1 embodiment, and those parts which are identical to corresponding parts in FIG. 1 are represented by the same reference numerals.

The casing 30 is smaller than in the first embodiment and has the shape of a cylinder which is open at the bottom for application to the surface of the honeycomb structure 1 to be checked. A partition 30b separates the interior of the casing into two cavities 30c and 30d, but in this case a seal is located only at the lower edge of the casing wall around its open end face. The lower edge of the central partition 30b does not have a seal, the purpose of this partition being simply to prevent direct passage of the compressed air from the inlet pipe 4 towards the outlet pipe 5, which would reduce the sensitivity of the measurement.

Thus, if the casing 30 is applied over an area of honeycomb structure where the bonding is sound, as shown in FIG. 3, the air entering the cells of the honeycomb from the cavity 30c will necessarily flow out again into the cavity 30d and will escape through the pipe 5 and the flowmeter 6. Measurement of an outflow equal to the inflow will thus be indicative of a sound checked area.

Figure 4:
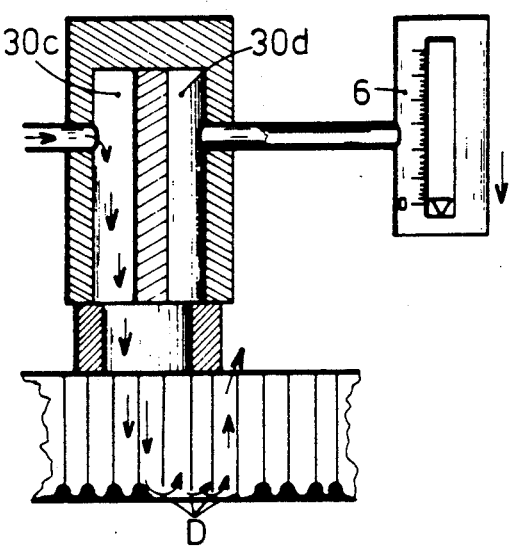

Conversely, if the casing 30 is applied over an area having bonding defects, as shown in FIG. 4, the air entering the honeycomb cells from the cavity 30c will escape outside the casing through the defects D and the adjacent cells.

In this case the flowmeter 6 will register a flow which is nil or close to zero, such a measurement indicating the presence of the casing over an area with a bonding defect.

The casing of this embodiment may be made to very small dimensions, and it is thus particularly suited to precise location of bonding defects and to the checking of areas of difficult access.

Figure 7:
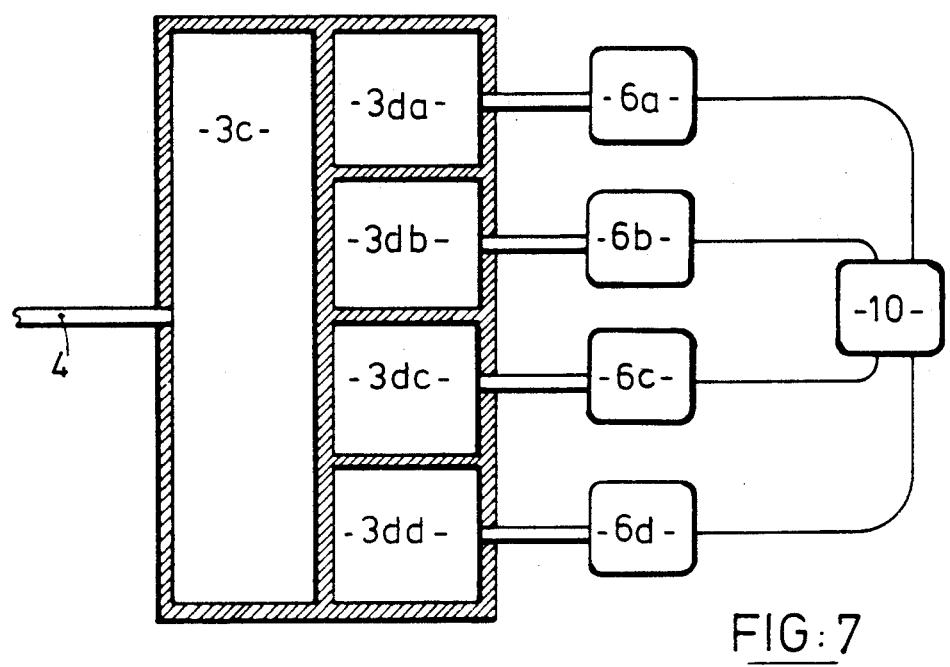
FIG. 7 is a diagrammatic view illustrating the principles of an alternative form of the casing shown in FIG. 1 suitable for carrying out more localized checks.

Another way of refining the checking by more precisely locating a bonding fault with respect to the width of the casing (relative to the direction of motion of the casing and not to its own geometry) is shown in FIG. 7. In this alternative, a modified form of the casing of the FIG. 1 embodiment is used in which the outlet compartment 3d is divided into four compartments (3da, 3db, 3dc, 3dd), the inlet compartment 3c remaining unchanged. The number of outlet compartments may be varied to take into account the size of fault which is permissible. The outlet compartments 3da, 3db, 3dc, 3dd are each connected to a flowmeter 6a, 6b, 6c, 6d, and the flowmeters are connected to a common recording unit 10 which is arranged to register the outlet compartment by which a fault was detected.

Figure 5:
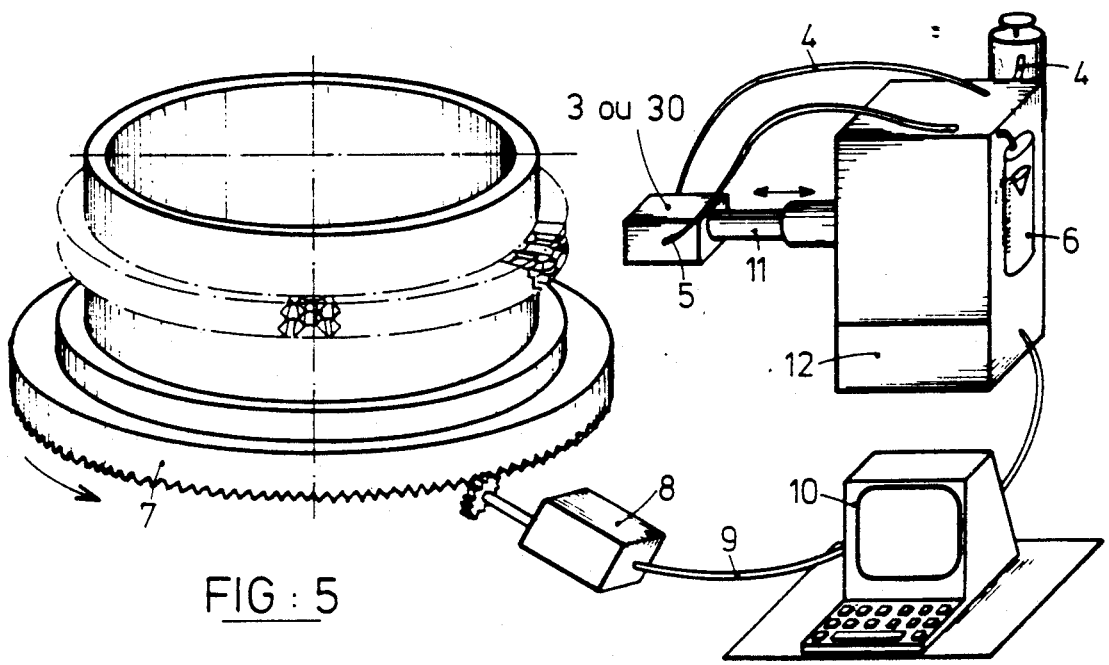
FIG. 5 is a diagrammatic view of an example of automated apparatus in accordance with the invention for use in checking the bonding of circular strips of honeycomb on a cylindrical casing.

FIG. 5 shows an automated embodiment of the invention applied to the checking of a honeycomb strip bonded to the outside of a turbojet fan casing.

The compartment to be checked is placed on a turntable 7 provided with a drive mechanism 8 for rotating the turntable in sequential steps. The drive mechanism 8 has an outlet 9 to a recording unit, for example a microcomputer 10, which will register the angular position of the component.

A detector casing 3 or 30 (depending on whether coarse detection or fine and localized detection is required) is mounted on a supporting arm 11 which is disposed radially relative to the component and is reciprocable linearly to apply the casing 3 or 30 against the outer surface of the honeycomb strip to be checked after each rotational step of the turntable.

The cavity 3c (or 30c) of the casing is connected, as in previous embodiments, to a source of compressed air by a pipe 4. If desired, the source may be controlled by a control unit, for example the micro-computer 10, to open the flow of air when the detector casing is applied by the arm 11 against the honeycomb structure, and to shut off the flow when the supporting arm begins its return stroke to retract the casing from the honeycomb. Alternatively, it will be possible to leave the flow open throughout the checking cycle, since the flow rates and pressure involved are relatively small.

The flowmeter 6 may be placed in the cabinet 12 of the supporting arm 11, and it may be coupled to the processing unit 10 so that the unit 10 is able to store the measured flow values and to correlate them with the angular positions of the turntable.

By effecting a single full rotation of the component with successive applications of a coarse detector casing 3 against the honeycomb strip, the detector being as wide as the honeycomb strip, it is easy to detect the angular positions where a bonding fault is present in the width of the strip. Then, to establish exactly where in the width of the strip the fault is situated, the detected area can be checked with a fine detector casing 30, an operation which may be performed either manually or by means of the above-described automated apparatus.

FIGS. 8 and 9 illustrate an embodiment in which the detector is able to roll (indicated by arrow R in FIG. 9) over the component to be checked, either by moving the detector (as indicated by arrow M) relative to a stationary component, or by moving the component (as indicated by arrow M1) while the detector support remains stationary. This embodiment is particularly suitable for use in checking the bonding of honeycombs to the inside of a cylindrical component.

In this embodiment a detector casing 300 comprises a distributor 310 which is rotatable around a fixed hub 320. The hub has a first radial duct 321 connected via inlet means to a source of compressed air 4, and a second radial duct 322 connected by outlet means and a duct 5 to a flowmeter 6 and a control unit 10.

Fixed to its periphery the distributor has an annular sealing member defining a succession of circumferentially spaced compartments separated from one another by sealing partitions 310b and open radially outwards for application to the honeycomb structure to be checked. In addition, the distributor comprises a plurality of radial inlet and outlet ducts 311 and 312 disposed so that each of said compartments communicates with an inlet duct 311 and with an outlet duct 312.

Seals 323 placed between the distributor 310 and side flanges 324 of the hub 320 prevent any leakage of air when the distributor rotates on the hub, and an 0-ring 326 suitably located between the hub and the distributor serves to isolate the inlet ducts 311,321 from the outlet ducts 312,322.

On the rotation of the distributor 310 on the hub 320 the inlet ducts 311 of each compartment in turn comes into communication with the first radial duct 321 of the hub to supply compressed air to the compartment (310c in FIG. 9), while the outlet duct 312 of the preceding or succeeding compartment (depending on the direction of rotation) communicates the compartment (310d in FIG. 9) with the second radial duct 322 of the hub to allow air to escape from the compartment to the flowmeter 6.

In operation at least two successive compartments 310c and 310d of the distributor are sealed against the surface of the honeycomb under test as the distributor rotates. The air from the source 4 passes through the duct 321 of the hub and a duct 311 of the distributor into the leading compartment 310c (with respect to the relative component/detector movement), which thus becomes an input compartment. If there is a bonding fault D in the area of the honeycomb covered by the compartments 310c,310d and their separating partition 310b, air escapes from the inlet compartment 310c to the other compartment 310d, which thus becomes an exhaust compartment. The air escapes from this compartment 310d through the associated duct 312 and the communicating duct 322 of the hub to the flowmeter 6. Thus, measurement of a flow of air by the flowmeter is indicative of a bonding fault, and no measurement of a flow is indicative of the absence of a fault, since no air is able to escape from the inlet compartment 310c to the outlet compartment 310d.

As the distributor rotates, each compartment in turn successively changes from being inactive to being an inlet compartment when it moves into sealing engagement with the surface of the honeycomb, to being an exhaust compartment when the following compartment comes into sealing contact with the honeycomb, and then to being inactive again when it moves out of contact with the honeycomb.

The embodiment described here makes it possible to check a casing for honeycomb bonding faults in a twentieth of the time taken using conventional methods, while maintaining uniform checking reliability from beginning to end.

Such a device has been successfully used on honeycombs of cell sizes as different as 7 mm, 3 mm and 1.57 mm, and may be used on any type of surface, be it flat, warped, or circular, whether inside or outside a casing.

We claim:

1. A method of checking the bonding of a honeycomb structure to a support, comprising the steps of:
   a) providing a detector casing which is open at one face thereof and which includes first and second compartments separated from each other by a partition, said first compartment being open at said open face of said casing and including inlet means, and said second compartment being open at said open face of said casing and including outlet means;
   b) connecting a supply of compressed air to said inlet means and connecting a flowmeter to said outlet means;
   c) applying said open face of said detector casing to said honeycomb structure at the end of the cells thereof remote from said support whereby air supplied to said first compartment is able to flow into at least those cells of said honeycomb structure which are covered at least partly by said first compartment;
   d) measuring the flow of air from said second compartment through said outlet means; and
   e) deducing from said measured flow of air the presence or absence of non-bonded zones between said honeycomb structure and said support.

2. A method according to claim 1, wherein said partition seals against said honeycomb structure when said open face of said detector casing is applied to said structure, whereby air is able to flow from said compartment to said second compartment only via bonding faults between said honeycomb structure and said support in the region of the cells of said structure which are covered by said partition, measurement of a flow of air through said outlet means indicating the presence of a bonding fault, and the absence of any measured flow through said outlet means indicating the absence of bonding faults.

3. A method according to claim 2, wherein the thickness of said partition which seals against said honeycomb structure is equal to the maximum size of a permissible bonding fault reduced by half the width of one of the cells of said honeycomb structure.

4. A method according to claim 1, wherein said partition does not seal against said honeycomb structure when said open face of said detector casing is applied to said structure, whereby air is free to flow from said first compartment to said second compartment, measurement of a flow of air through said outlet means which is less than the flow of air from said supply of compressed air idicating the presence of a bonding fault between said honeycomb structure and said support in the region in line with the walls of said detector casing around said open face thereof.

5. Apparatus for checking the bonding of a honeycomb structure to a support, said honeycomb structure comprising a plurality of cells which are bonded at one end to said support and are open at the opposite end thereof, said apparatus comprising a detector casing which is open at one face thereof, said open face of said casing being adapted to be applied flush against said honeycomb structure at the open end of said cells thereof, a partition dividing the interior of said casing into first and second compartments each of which open at said open face of said casing, an inlet pipe leading into said first compartment, a source of compressed air connected to said inlet pipe for feeding compressed air into said first comprartment, an outlet pipe leading from said second compartment, and at least one flowmeter connected to said outlet pipe for measuring the flow of air passing through said outlet pipe from said second compartment when the open face of said detector casing is applied against said honeycomb structure.

6. Apparatus according to claim 5, wherein said detector casing has the shape of a rectangular parallelepiped.

7. Apparatus according to claim 5, wherein said detector casing is cylindrical in shape.

8. Apparatus according to claim 5, further comprising a unit for recording the flows measured by said at least one flowmeter.

9. Apparatus according to claim 5, for use in checking the bonding of a honeycomb structure on the periphery of a circular component, said apparatus further comprising a turntable for mounting said component to be checked, said turntable including a device for effecting sequentially stepped rotation of said turntable and Providing an output signal representing the angular position of said turntable, a supporting arm carrying said detector casing and disposed radially relative to the component mounted on said turntable, said supporting arm being movable linearly in a reciprocating manner to apply the open face of said casing flush against said honeycomb structure after each rotational step of said turntable, and a processing unit connected to said at least one flowmeter for recording the flow values measured thereby, said processing unit also being connected to receive said output signal from said turntable rotating device for correlating said measured flow values with the angular position of the turntable.

10. Apparatus according to claim 9, including a control unit for controlling said source of compressed air so that compressed air is supplied to said first compartment of said detector casing when said casing is applied by said supporting arm against said honeycomb structure, and said supply of compressed air is shut off when said supporting arm begins to retract said casing.

11. Apparatus for checking the bonding of a honeycomb structure to a support, said honeycomb structure comprising a plurality of cells which are bonded at one end to said support and are open at the opposite end thereof, said apparatus comprising a detector casing defined by a central hub and an annular distributor rotatably mounted around said hub, said hub comprising first and second radial ducts, inlet means to said first radial duct, and outlet means from said second radial duct, a source of compressed air connected to said inlet means, and a flowmeter connected to said outlet means for measuring a flow of air through said outlet means from said second radial duct, said distributor comprising a peripheral annular sealing member defining circumferentially spaced compartments which are separated from one another by sealing partitions and are open radially outwards for application against said honeycomb structure at the open end of the cells thereof, and a plurality of radial inlet and outlet ducts disposed so that each compartment communicates with an inlet duct and with an outlet duct, whereby upon rotation of said distributor on said hub, the inlet duct of each compartment in turn comes into communication with said first radial duct of said hub to supply compressed air to said compartment, while the outlet duct of the preceding or succeeding compartment (depending on the direction of rotation) communicates with said second radial duct of said hub and hence with said flowmeter.

* * * * *